UNITED STATES PATENT OFFICE.

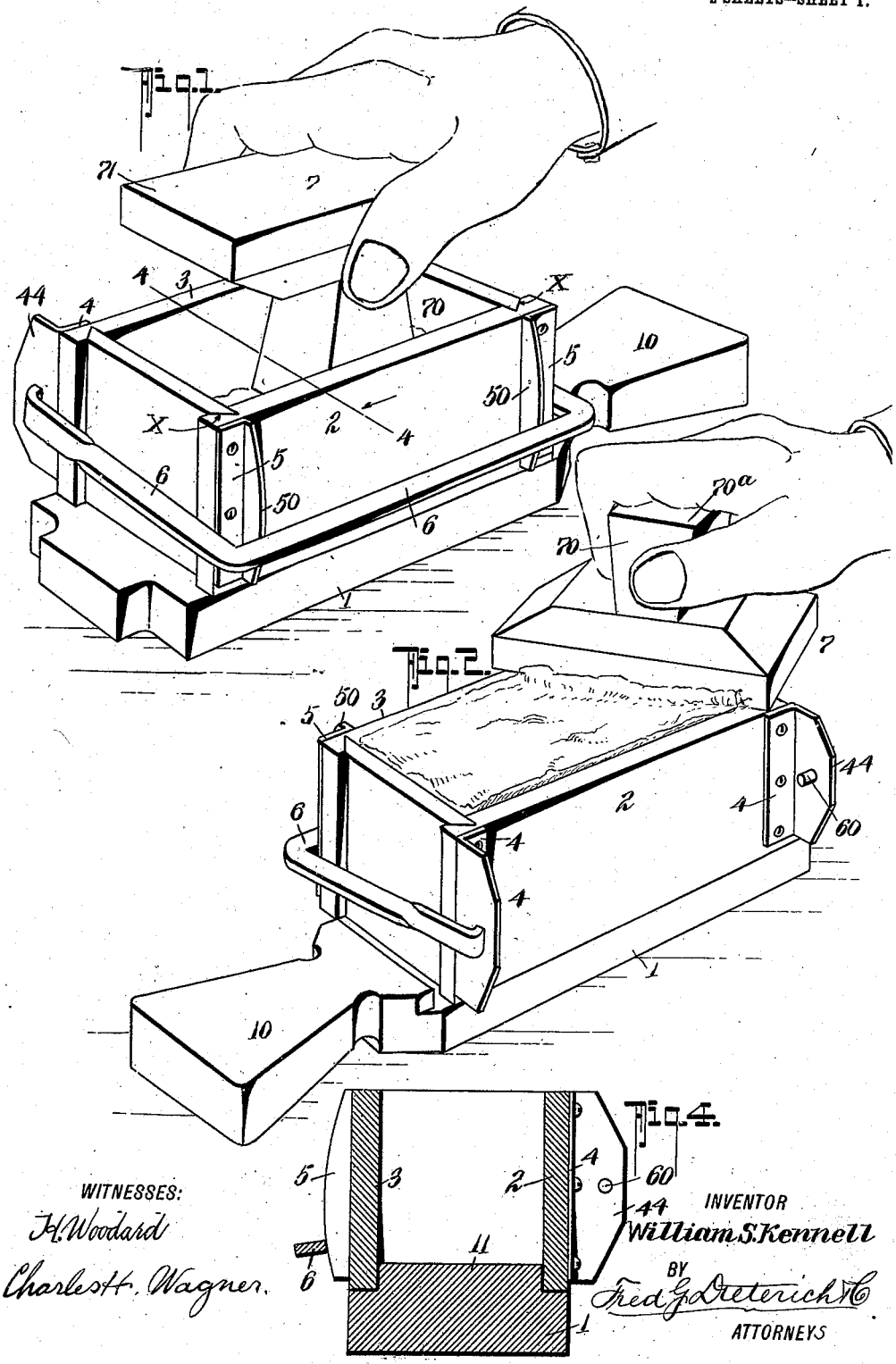

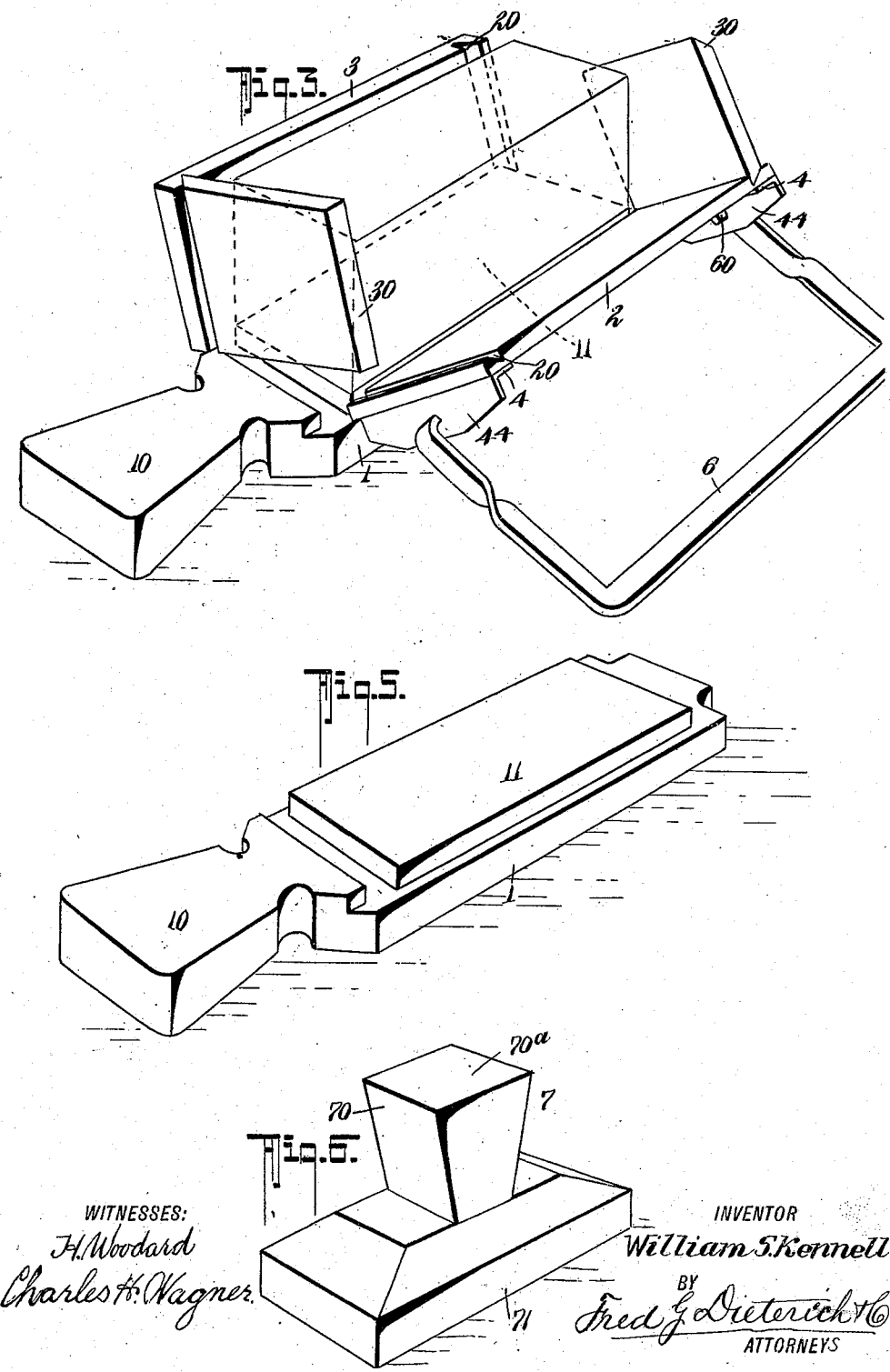

WILLIAM SHERMAN KENNELL, OF AMETHYST, COLORADO.

BUTTER-MOLD.

No. 923,853.  Specification of Letters Patent.  Patented June 8, 1909.

Application filed November 28, 1908. Serial No. 464,962.

*To all whom it may concern:*

Be it known that I, WILLIAM SHERMAN KENNELL, residing at Amethyst, in the county of Mineral and State of Colorado, have invented a new and Improved Butter-Mold, of which the following is a specification.

My invention more particularly refers to butter molds of that class utilized for forming butter into blocks of specific sizes and weights, and by which the butter is pressed into a convenient shape or print without the necessity of weighing each package.

This invention primarily has for its object to provide a butter mold of the character stated of a simple and economical construction, that can be conveniently handled to block the butter and transfer the block or print onto a suitable wrapper without the necessity of the hands touching the butter.

With the above and other objects hereinafter specified in view my invention comprehends, generally, an improved arrangement of mold that comprises a base having a handle, side and end members, loosely mountable on the base, and clamping devices carried by the side and end members and having such coöperative connection, whereby the sides and ends will drop away from the molded butter block when the clamp is released.

In its more subordinate features my invention consists in certain details of construction and peculiar combination of parts, all of which will be hereinafter fully described, specifically pointed out in the appended claims and illustrated in the accompanying drawings, in which:—

Figure 1, is a perspective view of my improved construction of butter mold, and shows the manner in which the presser is used for packing the butter on the mold. Fig. 2, is a similar view and shows how the presser is used for smoothing the top of the butter pack, prior to applying the print to its surface. Fig. 3, is a perspective view, that shows how the sides and ends fall away from the butter pack when the clamp yoke is thrown back or released. Fig. 4, is a transverse section of the mold, taken on the line 4—4 on Fig. 1. Fig. 5, is a perspective view of the combined base and handle portion. Fig. 6, is a perspective view of the presser.

In the practical embodiment of my invention I form the bottom or base member 1 with a handle extension 10 and with a raised block-like portion 11 of rectangular shape of suitable length and width. This portion, in making the member 1, is of a height sufficient to admit of its being dressed down to give the desired depth of the mold box and provide the exact space necessary to mold a butter block or print of the required weight.

The sides and ends of my form of mold consist of two parts, each of which comprises a side piece 2 and an end piece 3, that are secured by a miter joint X, so the two parts move as one, the free end of each of the side pieces having a miter groove 20 for receiving the beveled edges 30 of the end pieces 3—3 as clearly shown in the drawing, the said manner of connecting the ends and sides providing for a strong and durable connection of the several parts and for holding the sides and ends from spreading or warping endwise or laterally.

The two combined end and side members, when set up, provide a packing space of exactly the length and width of the raised surface on the bottom 1 and the lower edges of the said side and end members rest snugly against the side and end edges of the said raised surface on the bottom.

For positively holding the sides and end of the mold from warping or spreading endwise or sidewise, flat metal pieces 4—4 are fastened on the outer ends of one of the side members, said plates having right angled flanges 40 and similar flat plates 5—5 are secured at the outer ends of the other side piece, each of which has a curved right angle flange 50, and the said curved flanges extend from a point above to some distance below the axis of a bail-shaped clamp 6, the ends of which turn inwardly to form pintles 60 that engage bearings in the flanges 44 of the plates 4 fastened to one of the side members as clearly shown in Fig. 1.

By reason of forming the packing box in the manner shown and described it will be readily apparent that when the bail clamp is swung over onto the locking flanges 50 the several parts are tightly clamped together, said flanges having their curved edges so formed that the bail piece is caused to tightly bind thereon when pressed downwardly thereagainst.

Assuming the parts that constitute my mold as assembled and the two combined side and end members held locked against each other and the raised flange on the bottom, by the clamp device, the butter, after it has been properly worked, is put into the mold, and is pressed by means of the special form of presser device designated 7 in the drawings and which comprises a handle 70 having a presser surface 70ª and a plunger 71 that is of the size of the mold to snugly slide thereon, the under surface of the plunger being smooth throughout, the reason for which will presently appear. The butter is added to the mold and constantly forced down into the corners and otherwise by the small presser or plunger head 70ª until the required amount has been packed, after which, the other smooth faced or plunger head 71 of the presser 7 is drawn across the filled mold, angle-wise, as shown in Fig. 2, to smooth or level off the top of the packed substance, without danger of marring the edges of the mold, a result that happens when metallic scrapers and the like are used. After the butter has been formed to the proper size and bulk, by simply throwing the clamping lever back, the sides and ends fall away from the butter block and become detached from the bottom member 1, which with the butter package can be readily moved away from the separated members referred to and the bottom turned over to deliver the package onto a suitable wrapping material without the necessity of touching the butter with the hands.

Among other advantages, arranging the several parts as shown and described is that it provides for easily cleaning them, and the joints of the mold box members are such that moisture will not affect the sides and ends, and they will maintain their position without crocking or twisting out of shape, and furthermore, as the metal members are secured flatwise against the side members they can also be readily cleaned.

Having thus described my invention what I claim and desire to secure by Letters Patent is:—

1. A butter mold comprising a member formed with a handle and with a raised portion that forms the bottom of the mold box, side and end members to close against the edges of the said bottom portion, one of the end members being secured to move with one of the side members and adapted to loosely interlock with the other side member, a clamping means for said members secured to one of said side members and adapted to be swung over the other side and end members and hold the side and end members in their closed position.

2. In a butter mold, a base member having a raised portion that forms the bottom of the mold box, a mold box consisting of two parts, each comprising fixedly joined side and end members, the free ends of the end and side members being arranged to interlock when the parts are assembled, a clamping means for holding them interlocked, said members being freely movable away from the butter package when the clamping means is released.

3. A butter mold that comprises a base member having a handle at one end and a raised portion at the other end that forms the bottom of the mold box, a box for fitting over the said bottom formed of collapsible side and end members, a clamping bail mounted on one of the side members that closes over the other side member and the end members, said member with the base completed butter package being freely separable from the collapsible side and end members when the clamping bail is at its released position.

4. A mold for giving shape to butter and other plastic material, comprising a base member having a handle portion and a raised bottom section having straight side and end edges, a boxing consisting of two parts, each consisting of an end and a side member, the free ends of the side members and the adjacent ends of the end members having interlocking portions, angle plates secured on the outer edges of both side members, the set of plates at one side having curved locking flanges, the set of plates at the other side having angle members and a bail piece pivotally mounted on the angle members and having its cross piece arranged to swing over and clamp on the locking curved flanges of the locking plates.

WILLIAM SHERMAN KENNELL.

Witnesses:
  A. L. WILSON,
  E. B. TODD.